Figure 1:
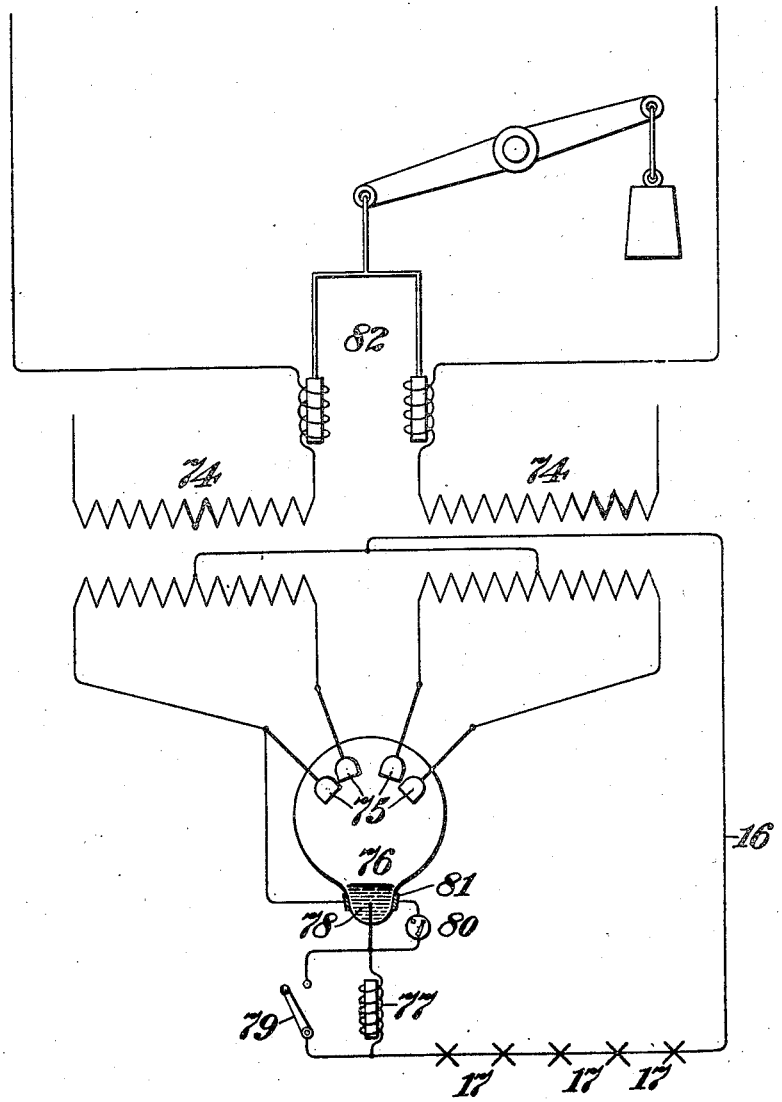

P. H. THOMAS.
OPERATION OF VAPOR CONVERTERS.
APPLICATION FILED OCT. 23, 1907.

1,110,594.

Patented Sept. 15, 1914.

2 SHEETS—SHEET 1.

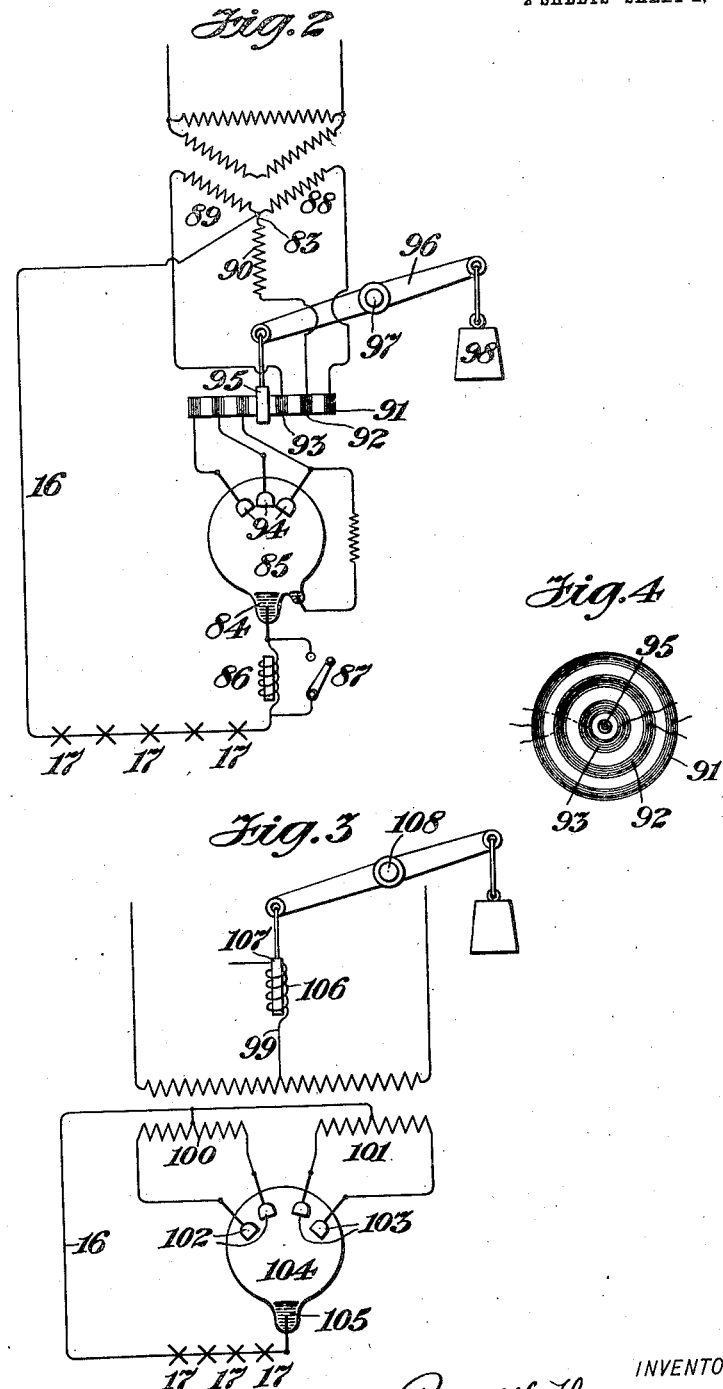

UNITED STATES PATENT OFFICE.

PERCY H. THOMAS, OF MONTCLAIR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

OPERATION OF VAPOR-CONVERTERS.

1,110,594.  Specification of Letters Patent.  Patented Sept. 15, 1914.

Continuation in part of application Serial No. 140,353, filed January 24, 1903. Divided and application filed September 1, 1905, Serial No. 276,672. This application filed October 23, 1907. Serial No. 398,708.

*To all whom it may concern:*

Be it known that I, PERCY H. THOMAS, a citizen of the United States, and resident of Montclair, county of Essex, State of New Jersey, have invented certain new and useful Improvements in Operation of Vapor-Converters, of which the following is a specification.

In a certain application, Serial Number 276,672, filed September 1, 1905, of which this application is a division, claims are made on certain embodiments of the invention here described.

The present application is, in part, a continuation of my prior application Serial Number 140,353, filed January 24th, 1903.

My invention contemplates the application of the principles set forth in the above patent applications to polyphase circuits and provides certain improvements upon the apparatus therein disclosed. For example, the present invention shows the regulator adapted to a polyphase rectifier in such a manner as to provide a specially economical and simple construction and organization of circuits.

By my invention movable coils may be dispensed with and the regulator core or cores may be relieved of the alternating magnetism found unavoidable in other arrangements. I further provide a means for utilizing a single coil regulator for a three wire two phase circuit thus securing great economy of apparatus.

My invention includes other features which will be seen by examination of the drawings.

My invention is illustrated in the accompanying drawings in which—

Figures 1, 2, and 3 are diagrams of various embodiments of the present invention; and Fig. 4 is a detail plan view of the coils 91, 92 and 93 of Fig. 2.

In Fig. 1 I show the system as applied to a quarter-phase supply, indicated at 74, 74, the terminals of each phase of the source being joined to one pair of the positive electrodes, 75, 75, 75, 75, in a vapor converter, 76; and an intermediate point being connected through a consumption circuit 16 containing translating devices, 17, 17, 17, being joined through an inductance, 77, to the negative electrode 78 of the said converter.

A switch, 79, may short-circuit the inductance 77 and a snap or quick-break switch, 80, extending from the lead of the negative electrode to a starting band, 81, surrounding the same may be utilized for creating a critical strain at the negative electrode which will assist in the starting of the apparatus.

A regulator, 82, located in the inducing circuit of the generator, 74, may be utilized for causing constant alternating current to be supplied to the system.

Fig. 2 shows the system as applied to a three-phase source, the neutral point, 83, of which is connected to the negative electrode, 84, of a converter, 85, through a work circuit, 16, and an inductance, 86, in the usual way, the work circuit containing translating devices, 17, 17, 17 such as arc lamps. I provide a switch, 87, as usual, for short-circuiting the inductance, 86, if desired. The terminals of the coils, 88, 89 and 90 of the three-phase apparatus are connected through concentric coils, 91, 92 and 93, respectively, to the positive electrodes, 94, 94, 94, of the converter 85. The said concentric coils act upon a common core or armature, 95, located inside the coil 93, and connected with a lever, 96, pivoted at 97, carrying at its opposite end a counterweight, 98. The apparatus including the core, 95, the lever 96, and the counter-weight 98 constitutes a regulator acting in the manner already described.

In Fig. 3 I show a system of circuits generally similar to that illustrated in Fig. 1, although in this instance a two phase primary winding is made to coöperate with the two phase secondaries, 100, and 101, the terminals of which secondaries are connected, respectively, to the positive electrodes, 102, 102 and 103, 103, inside a vapor converter, 104. Intermediate points of the said secondaries are connected by a circuit 16 through arc lamps or other translating devices, 17, 17, 17, to the negative electrode, 105, of the converter 104. A regulator consisting of a coil, 106, located in the lead 99, a core, 107, and suitable counter-balancing devices pivoted at 108, serves to control the supply of both phases to the translating devices, as has already been explained.

Fig. 4 shows a plan view of the coils and core of the regulator of Fig. 2 here as before, 91, 92 and 93 represent the three concentric coils and 95 the core.

The various coils and counter-weighted cores in the drawings are shown in diagrammatic form and it is understood that these regulators relate to means and methods whereby a reactance coil acts in opposition to a mechanical force which is so correlated to the magnet pull of the coil that the choking effect of the coil could vary automatically to compensate for changes of resistance in the receiving circuit.

I claim as my invention:—

1. In a system of electrical distribution, the combination with a polyphase mercury vapor rectifier, comprising an hermetically sealed and completely exhausted container, a vaporizable reconstructing cathode, adapted to deliver direct currents to a work circuit, and a plurality of anodes therein, of a polyphase source connected by its terminals to the anodes of the said rectifier and from an intermediate point to the cathode thereof through the work circuit, and a constant current regulator including a coil carrying intermittent direct current in the lead of each anode and a common movable core for the said coils.

2. The combination with a mercury vapor rectifier having three anodes receiving intermittent direct current and a single cathode delivering direct current and a constant current regulator therefor, comprising three coils electrically independent but coöperating upon a common core and each traversed by the intermittent current to one of the anodes, of means for balancing the resultant pull of the coils for all positions of the core.

3. The combination with a constant direct current work circuit, of a vapor rectifier comprising an hermetically sealed and completely exhausted container including a plurality of anodes and a vaporizable reconstructing cathode therein, of means for absorbing excessive supply voltage, automatically adjustable in response to energy flow in the receiving circuit comprising inductance coils traversed individually by intermittent direct current supplied to said rectifier and a core for said coils.

4. In a system of electrical distribution, the combination with a polyphase source, a direct current work circuit, and a mercury vapor rectifier including an exhausted container, suitable electrodes therefor, of a single movable counterweighted core controlled in position by the mutual action of the several phases of the supply and the counter weight.

5. In a system of electrical distribution, the combination with a polyphase source, a polyphase vacuum rectifier and a direct current work circuit supplied therefrom, of a symmetrical polyphase regulator having an inductance coil connected between each terminal of the source and an anode and a single mechanical means for balancing the magnetic force of said coils in all positions for a given current.

6. In a system of electrical distribution, the combination with a polyphase source, a polyphase vacuum rectifier and a direct current work circuit supplied therefrom, of a symmetrical polyphase regulator having a coil connected between each terminal of the source and an anode and a common movable core for the several coils, its magnetic attraction being balanced by mechanical force for a given current.

7. In a system of electrical distribution, the combination with a polyphase source, a direct current work circuit, and a vapor rectifier including an exhausted container, anodes and a vaporizable cathode therefor, of a single counter weighted core, said core being movable and being mechanically balanced with normal current in the system by a counter weight and means for magnetizing said core through the combined action of the flow of current from the several phases of the source.

Signed at New York, in the county of New York, and State of New York, this 22nd day of October, A. D. 1907.

PERCY H. THOMAS.

Witnesses:
WM. H. CAPEL,
GEORGE H. STOCKBRIDGE.